Dec. 13, 1949

T. OBSZARNY 2,490,917

INTERLOCK OVERLOAD RELAY ASSEMBLY

Filed May 23, 1945

Inventor:
Thedore Obszarny
By Baird Freeman
Attorneys

Dec. 13, 1949 T. OBSZARNY 2,490,917
INTERLOCK OVERLOAD RELAY ASSEMBLY
Filed May 23, 1945 3 Sheets-Sheet 2

Inventor:
Thedore Obszarny
By Bair & Freeman
Attorneys

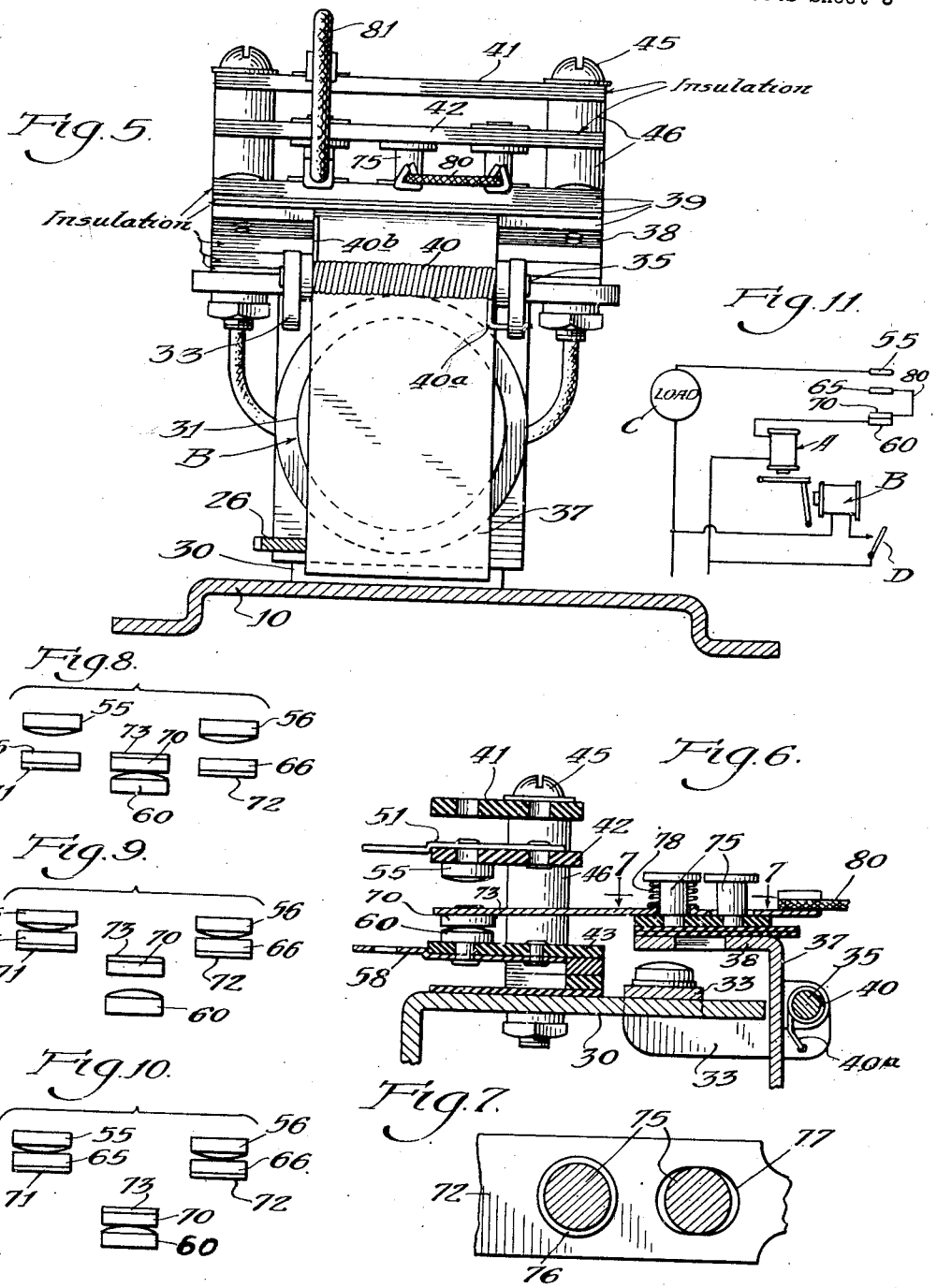

Patented Dec. 13, 1949

2,490,917

UNITED STATES PATENT OFFICE 2,490,917

INTERLOCK OVERLOAD RELAY ASSEMBLY

Thedore Obszarny, Chicago, Ill., assignor to Guardian Electric Manufacturing Co., Chicago, Ill., a corporation of Illinois Application May 23, 1945, Serial No. 595,289

3 Claims. (Cl. 200—98)

This invention relates to electrical control devices of the interlocking, overload relay type for breaking an electrical circuit when an overload condition exists in said circuit.

Devices of this general class are in the nature of protective devices, intended to prevent injury or damage to various types of electrically energized apparatus by an overload condition in the circuit in which such apparatus is connected. For example, in certain types of communication systems utilizing vacuum tubes, it is highly important to safeguard against damage or burning out of such tubes which may occur as a result of excessive overload of the electrical circuit. In devices heretofore employed for this purpose there usually is provided an overload electromagnet in the load circuit, said magnet coacting with a relay in a separate control circuit. By virtue of the latter circuit the main load circuit is controlled, or reset, and usually a switch, such as a push-button switch, is connected in the control or reset circuit, which switch may be located adjacent to or at a point remote from the apparatus of the load circuit. When the load circuit is broken by operation of the electro-magnet it indicates a defect in the circuit in the nature of an overload condition, which defect should be corrected to avoid possible damage to the apparatus of the circuit. While such prior control devices function to break the load circuit upon the existence of an overload condition, it has frequently happened, especially when the reset switch is located remote from the apparatus, that the source of trouble causing the overload condition is not sought out and remedied. Sometimes the reset switch is held closed, causing re-cycling of the control device and thus making and breaking the load circuit and subjecting the apparatus to possible damage or destruction by the existence of the overload condition. In some of such control devices the holding of the reset switch in closed position serves to positively maintain the load circuit completed, and in so doing the apparatus of the load circuit is subjected to an overload condition which might result in damage or permanent injury to the apparatus in the load circuit.

One of the objects of the present invention is to provide an improved control device, of the character indicated, adapted to be reset to establish a load circuit by means of a switch in a reset or control circuit, and said control device being constructed and arranged so as to function in a manner which insures positive completion and maintenance of a load circuit under normal operating conditions, and adapted to positively break the load circuit and prevent re-establishment thereof for any substantial period of time to eliminate possible damage to the apparatus of the load circuit during the existence of an overload condition.

Another object is to provide an improved control device of the character indicated, which precludes completion of the load circuit during the interval when the reset switch of the reset or control circuit is held in closed position.

A further object is to provide an improved control of the character indicated which functions as a safety device for precluding the maintenance of an electrical load circuit when a predetermined overload condition exists in the circuit.

Other objects and advantages of this invention will be apparent from the following description, taken in connection with the accompanying drawings in which.

Figures 1, 2:
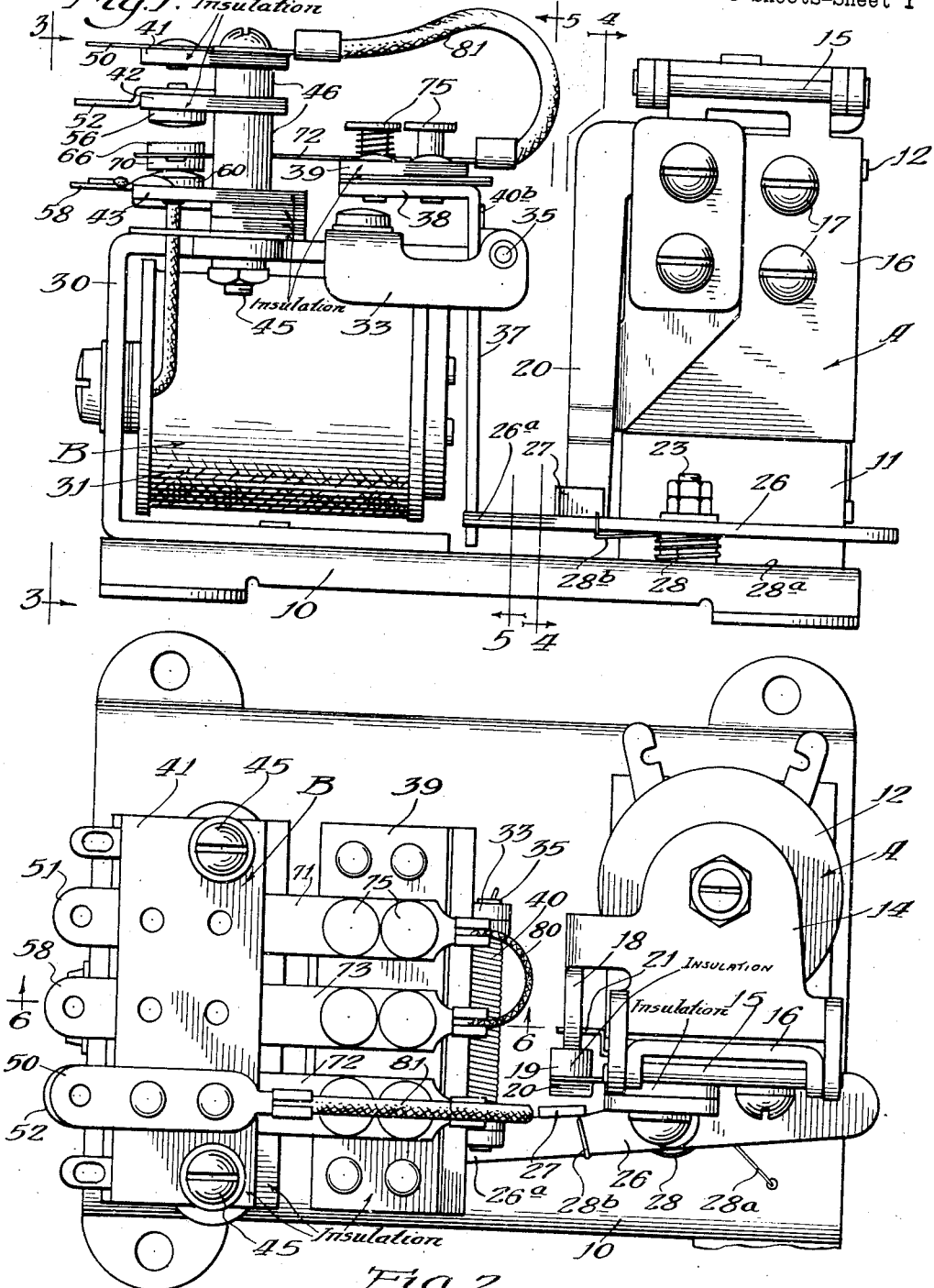
Figure 1 is a side elevational view of the control device embodying the present invention.
Figure 2 is a plan view of the device.
Figure 3:
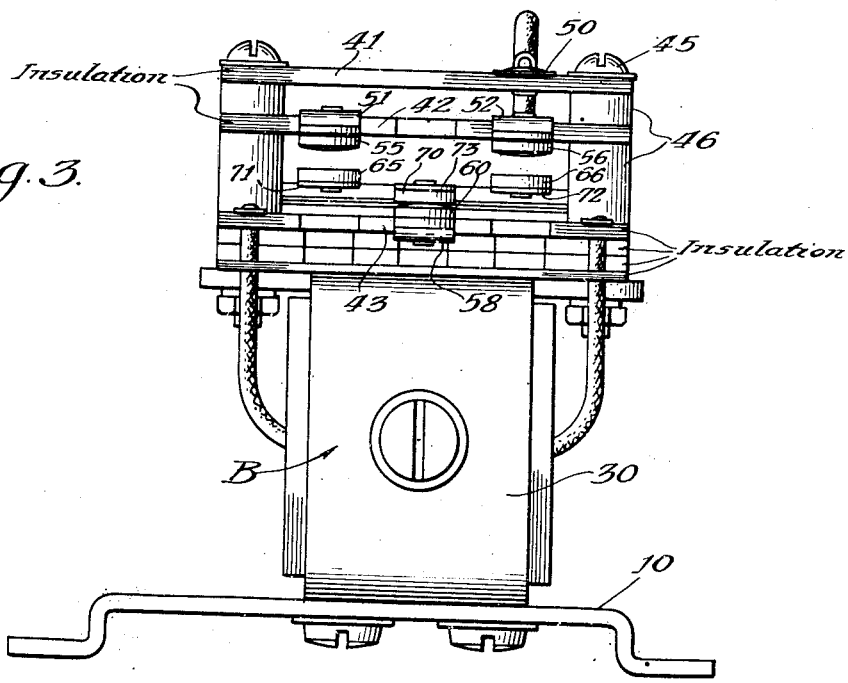
Figure 3 is an end view of the control device taken substantially as indicated at line 3—3 on Figure 1.
Figure 4:
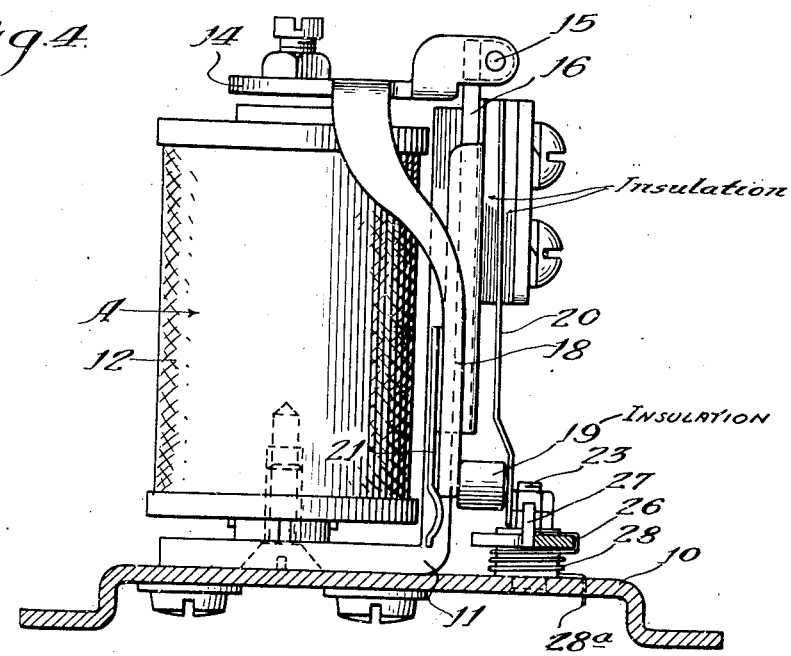

Figures 4 and 5 are vertical sectional views through the control device, taken substantially as indicated at lines 4—4 and 5—5, respectively, on Figure 1;

Figure 6 is a vertical sectional view through the contacts of the reset relay, taken substantially as indicated at line 6—6 on Figure 2;

Figure 7 is a horizontal sectional view through one set of contact mountings, taken substantially as indicated at line 7—7 on Figure 6;

Figure 8 is a diagrammatic representation of the relay contacts of the load circuit, shown in open circuit position;

Figure 9 is a view similar to Figure 8 showing the contacts in a safe, reset, open circuit position;

Figure 10 is a view similar to Figure 8 showing the contacts in a reset, operating condition; and Figure 11 is an illustrative wiring diagram of a load circuit and reset circuit, including the control device.

The control device embodying the present invention is in the nature of a unitary assembly, including a mounting base 10 preferably formed of sheet metal, on which are rigidly mounted an overload electro-magnet, indicated generally at A, adapted to be connected in the load circuit, and a relay B adapted to be connected in a reset or control circuit.

The electro-magnet includes an L-shaped field piece 11, an upright or vertically disposed coil 12, and an armature 14 hingedly connected to a pivot pin 15 carried on the upper end of a bracket 16 which is attached to the upright leg of the field piece 11 by screws 17. It is to be understood that the electro-magnet coil is constructed and arranged so that when connected in series in the load circuit said magnet will not normally be energized to attract its armature 14. In other words, the coil will become sufficiently energized to develop a magnetic field for attracting its armature only when the load circuit is overloaded, such as may be caused by a short circuit or the like, or by increase in energy from the power source.

The armature 14 includes a laterally and downwardly extending leg or actuating member 18, to the lower end of which is secured an insulating button 19 positioned in engagement with a depending spring finger 20 secured to the bracket 16. Said finger serves to yieldingly urge the leg or actuating member 18 against a fixed stop member 21 with the armature 14 disposed at a released position, as seen in Figure 4 of the drawings.

Pivotally mounted on a pin 23 connected to and extending upwardly from the base 10 is a horizontally disposed latch member 26, adapted to provide cooperating interlocking relationship with the armatures of the magnet and relay. The latch member is provided with an upstanding lug 27 positioned to coact with the lower end of the spring finger 20 of the electromagnet A. A coil spring 28 is wound around the base portion of the pin 23 and has one leg 28a anchored in the mounting base 10 and the opposite leg 28b engaging the latch member so as to yieldingly urge said latch member in a clockwise direction, and adapted when in a latching position to abut against the lower end of the spring finger 20. The operating end of the latch member, as indicated at 26a, is adapted to cooperate with the armature of the relay, as will be presently described, for latching it at a position intermediate its attracted and released positions.

The relay B includes a horizontally disposed, U-shaped field piece 30 with one leg connected to the base 10, and within the field piece is mounted a horizontally extending coil 31. Rigidly attached to the upper horizontal leg of the field piece is a saddle shaped bracket 33, having forwardly extending arms projecting beyond the free end of the coil, carrying a pivot pin 35 on which is mounted a depending armature 37. The upper end of the armature terminates in a laterally extending shelf 38 on which are mounted panels 39 of insulating material. Said armature 37 is yieldingly urged to a released position by means of a coil spring 40 mounted on the pivot pin 35 with one leg of the spring as indicated at 40a, anchored in one of the legs of the saddle bracket 33, and the other leg 40b abutting against the upper portion of the armature 34, as clearly seen in Figures 5 and 1, respectively.

Mounted on the upper leg of the field piece 30, rearwardly of the saddle bracket 33, are three vertically spaced apart panels 41, 42 and 43 of insulating material, rigidly anchored together and connected to the field piece by bolts 45 with spacer members 46 interposed between the respective panels. Mounted on the upper panel 41 is a conductor strip 50, and mounted on the panel 42 is a pair of transversely spaced apart conductor strips 51 and 52. Projecting from the underside of the panel 42 and operatively connected to the respective conductor strips 51 and 52 are contact buttons 55 and 56. Mounted on the underside of the panel 43 is a conductor strip 58, and mounted on the upper surface of said panel 43 and operatively connected to the conductor strip 58 is a contact button 60. Cooperating with the respective contact buttons 55, 56 and 60 are contact buttons 65, 66 and 70, which buttons are mounted on the free ends of flexible spring contact fingers 71, 72 and 73, respectively. Said contact fingers 71, 72 and 73 are mounted on the insulating panels 39 carried by the shelf 38 of the armature, and the connection portion 38 of each of the fingers to said panels 39 consists of a pair of fixed, headed studs 75. The fingers are each provided with a pair of longitudinally spaced apertures 76 and 77 through which the shanks of said studs extend. Coil springs 78 are interposed between the heads of the forwardmost series of studs and the respective contact fingers 71, 72 and 73, as clearly seen in the drawings. The aperture 77 of each of the respective fingers, as seen in Figure 7 of the drawings, is of elongated form and permits freedom of movement of the terminal ends of said fingers incident to make and break engagement of the contact buttons of the respective series of fingers with the contact buttons mounted on said panels 42 and 43. It is to be understood that the mounting for the spring fingers is such that the middle contact finger 73, in one direction of movement of the armature, has a delayed action as compared to the fingers 71 and 72, and with respect to the other direction of movement of the armature, said contact finger 73 is actuated prior to the movement of the contact fingers 71 and 72.

The contact fingers 71 and 73 are interconnected at their terminal ends by a conductor wire 80, placing said contact strips in series with each other. The terminal end of the conductor strip 50, mounted on the upper panel 41, is connected by a conductor wire 81 to the terminal end portion of the contact finger 72. It is to be understood that the forwardly projecting terminal portions of the conductor strips 51 and 58 are adapted to be connected in series relation with the coil 12 of the overload magnet, and with the load in the load circuit, and the forwardly extending terminal portions of the conductor strips 50 and 52 are adapted to be connected in a pilot light circuit.

As may be seen in the drawings, when the relay B of the reset or control circuit has been energized and the armature 37 attracted, the latch member 26, by the action of the spring 28, moves into blocking relation to the armature 37 so as to preclude return movement of said armature to full release position. It is to be understood however that there is a slight amount of clearance between the extreme end of the latch member and said armature 37 when the latter is in full attracted position. In other words, the latch member serves to latch the armature 37 at an intermediate position between its attracted and released positions. When the armature 14 of the overload magnet is attracted to its coil, incident to an overload condition in the load circuit, the leg member 18 connected to the armature, acting through the insulating button 19 and spring finger 20, engages the upstanding lug 27 of the latch member and thus moves the latch member out of blocking relation to the armature 37 of the relay so as to permit said relay armature 37 to move to full released position, as seen in Figures 1 and 2 of the drawings. The latch member 26, upon de-energization of the magnet A, then engages the edge of the relay armature 37.

For an understanding of the function of the control device embodying the present invention, reference is made to the wiring diagram of Figure 11 wherein it will be noted that in the load circuit the two sets of switch contacts 55—65 and 70—60 are connected in series relation with the coil 12 of the magnet A, and the load indicated generally at C. The coil 31 of the relay B is connected in a separate circuit in series with a reset switch, indicated generally at D. The circuit including the relay B and the reset button D is in effect a controlling or resetting circuit for the main load circuit which includes the electromagnet A, the load C, and the two switches composed of the respective sets of contacts 55—65 and 70—60. In the normal, inoperative position of the control device, that is, when the reset and the load circuits are open, the contacts 55—65 and 70—60 are in the relation as indicated diagrammatically in Figure 8 of the drawings. When the load circuit is to be operated, the switch D of the reset circuit is temporarily closed, thus energizing the coil of the relay B and attracting the armature 37 to the coil. By virtue of this action the contacts 65 and 66 of the contact fingers are, during the initial portion of such movement of the armature 37, caused to engage the corresponding stationary contacts 55 and 56, and during the subsequent portion of such movement of the armature 37 the contact 70 is moved out of engagement with its corresponding stationary contact 60, as clearly seen in the diagrammatic representation of Figure 9 of the drawings. In this position of adjustment of the contacts the load circuit is still broken because the action in completing the load circuit through the contacts 55—65 is substantially instantaneous with the breaking of the contacts 70—60. When the armature has been so moved, that is, to attracted position, the latch member 26 moves into blocking relation to the armature so that upon subsequent opening of the switch D, and for practical purposes, it may be assumed that the switch D is a push button, the armature 37 tends to move to its release position, and is blocked at an intermediate position by engaging the end of the latch member 26. Such movement of the armature 37 to the blocked position permits sufficient rocking movement of the panel 39 carrying the contact strip 73 so as to permit its contact button 70 to again make contact with the cooperating contact button 60, and contact buttons 65 and 66 remaining in engagement with their respective cooperating contact buttons 55 and 56, as represented diagrammatically in Figure 10 of the drawings, thus completing the load circuit, and which may be considered as constituting a reset operation. The load circuit will remain in operation as long as the load does not exceed a predetermined amount, as determined by the capacity of the coil 12 of the electro-magnet A. To open the load circuit the latch member 26 is moved out of latching relation to the armature 37.

The relay B in its locked position, as above described, maintains the load circuit unless an overload condition takes place in the load circuit, at which time the electro-magnet A becomes energized and causes attraction of its armature 14, and through the leg 18, insulating button 19 and finger 20 causes the latch member 26 to move out of blocking relation to the armature 37 of the relay B and permits said armature 37 to move to full released position, at which time the contact buttons 55—65 and 70—60 again assume an open circuit position of adjustment, as represented in Figure 8 of the drawings. If the push button switch D is again actuated in a conventional manner to energize the relay B the device will recycle; that is, the contacts will be reset for re-establishing the load circuit and the load circuit will be immediately broken by virtue of the overload condition, causing energization of the magnet A. This will continue to occur as long as the push button switch is operated conventionally. If, however, the push button switch D is held in closed position, as sometimes may happen, the relay coil will be energized and the armature 37 held in full attracted position, and the switch contacts will remain in an open load circuit position, as clearly seen in Figure 9 of the drawings. Therefore, it is impossible to positively maintain the load circuit completed, when an overload condition exists, by maintaining the reset switch D in a closed position. By virtue of the control embodying the present invention, damage or possible injury to electrically operated apparatus of a load circuit is eliminated.

Although I have herein shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited by the appended claims.

I claim as my invention:

1. An electrical control device of the character described comprising an overload electro-magnet adapted to be connected in a load circuit to be controlled, a relay adapted to be connected in a reset circuit, and having a pair of switches in series in the load circuit, said magnet and relay each having an armature, said magnet causing opening of one of said switches upon overload and said relay causing closure of said one switch and opening of the other upon energization of the relay, and causing closure of said other switch upon deenergization of the relay, and latch means coacting with said armatures and adapted to retain said relay armature at an intermediate position of its range of movement, upon de-energization of the relay, for maintaining both switches closed and completing the load circuit.

2. An electrical control device of the character described comprising an overload electro-magnet adapted to be connected in a load circuit to be controlled, a relay adapted to be connected in a reset circuit, and having a pair of switches in series in the load circuit, said magnet and relay each having an armature, said magnet causing opening of one of said switches upon overload, and said relay causing closure of said one switch and opening of the other upon energization of the relay, and causing closure of said other switch upon de-energization of the relay, and latch means coacting with said armatures and adapted to retain said relay armature at an intermediate position of its range of movement, upon de-energization of the relay, for maintaining both switches closed and completing the load circuit, said latch means being actuated by the magnet armature upon overload of the load circuit, for disengaging said relay armature and causing opening of said one switch to break the load circuit.

3. An electrical control device of the character described comprising an overload electro-magnet adapted to be connected in a load circuit to be controlled, a relay adapted to be connected in a reset circuit, and having a pair of switches in series in the load circuit, said relay including an armature, and a latch for engaging said armature at intermediate position of its range of movement, said magnet causing disengagement of said latch for opening one of said switches upon overload, said relay causing closure of said one switch and opening of the other upon energization of the relay, and causing closure of said other switch upon de-energization of the relay, and said latch engaging said armature at said intermediate position upon said de-energization of the relay for maintaining both switches closed and re-establishing said load circuit, subject to the load condition of said load circuit.

THEDORE OBSZARNY.

REFERENCES CITED

The following references are of record in the file of this patent:

UNITED STATES PATENTS

| Number | Name | Date |
| --- | --- | --- |
| 449,780 | Muller et al. | Apr. 7, 1891 |
| 1,221,499 | Zimmer | Apr. 3, 1917 |
| 1,731,580 | Knaak | Oct. 15, 1929 |